United States Patent [19]

Fabel et al.

[11] 3,958,097

[45] May 18, 1976

[54] PLASMA FLAME-SPRAYING PROCESS EMPLOYING SUPERSONIC GASEOUS STREAMS

[75] Inventors: Arthur J. Fabel, Amherst, Mass.; Herbert S. Ingham, Jr., Northport, N.Y.

[73] Assignee: Metco, Inc., Westbury, N.Y.

[22] Filed: May 30, 1974

[21] Appl. No.: 474,832

[52] U.S. Cl. .................. 219/76; 219/121 P

[51] Int. Cl.[2] .................. B23K 5/00

[58] Field of Search .................. 219/76, 121 P, 75; 117/93.1 PF, 105.1; 313/231.3, 231.4

[56] References Cited

UNITED STATES PATENTS

| | | | |
|---|---|---|---|
| 2,960,594 | 11/1960 | Thorpe | 219/75 |
| 3,179,783 | 4/1965 | Johnson | 219/76 |
| 3,179,784 | 4/1965 | Johnson | 219/76 |
| 3,183,337 | 5/1965 | Winzeler et al. | 219/76 |
| 3,194,941 | 7/1965 | Baird | 219/121 P |
| 3,304,402 | 2/1967 | Thorpe | 219/121 P X |
| 3,573,090 | 3/1971 | Peterson | 117/93.1 |
| 3,673,375 | 6/1972 | Camacho | 219/121 P |
| 3,823,302 | 7/1974 | Muehlberger | 219/121 P |
| 3,839,618 | 10/1974 | Muehlberger | 219/121 P |
| 3,851,140 | 11/1974 | Coucher | 219/121 P |

*Primary Examiner*—J. V. Truhe
*Assistant Examiner*—G. R. Peterson
*Attorney, Agent, or Firm*—Burgess, Dinklage & Sprung

[57] ABSTRACT

An improvement in a process for high velocity plasma flame-spraying of a powder onto a workpiece wherein an unlit plasma gas is passed through the nozzle of a plasma flame-spraying gun at a high velocity of at least 90 meters per second and an electric arc is struck between an electrode within said gun and a portion of said nozzle and powder is fed into the resultant flame exteriorly of said nozzle and said gun, which improvement comprises increasing the deposit efficiency of the coating of the powder onto the workpiece by carrying out said process such that the power through said electric arc is at least 15 kilowatts, disposing the arc created at the exit rim of said nozzle by regulating the gas velocity, length of nozzle and diameter of nozzle bore such that said arc is established at said exit rim of said nozzle, especially a process wherein a gas back pressure is maintained within said nozzle which is greater than 1 atmosphere gauge, the ignited plasma gas has an enthalpy of at least 7000 joules/standard liter of gas such that there are created zones of compression and rarefaction coterminously in the resultant flame and the powder is introduced into the zones of rarefaction; an apparatus for carrying out such a process.

7 Claims, 2 Drawing Figures

PLASMA FLAME-SPRAYING PROCESS EMPLOYING SUPERSONIC GASEOUS STREAMS

BACKGROUND OF THE INVENTION

FIELD OF THE INVENTION

This invention is directed to an improved process for plasma flame-spraying of powder particles of metal, metal oxide, carbide, ceramic or the like whereby improved coatings are provided together with longer nozzle and gun life. This invention is particularly directed to an improved process for plasma flame-spraying wherein higher velocities of gas together with smaller gas passages are employed, and other parameters are selected so as to establish the arc created during the plasma flame-spraying process at the exit rim of the nozzle whereby substantially higher power can be tolerated. This in turn provides a markedly increased deposit efficiency in respect of the coating and allows powder feed rates into the resultant flame generally higher than heretofore employed.

DISCUSSION OF THE PRIOR ART

Plasma flame-spraying is a particular method whereby at least one gas is caused by virtue of its passage through an electric arc to be put into an excited state. This state corresponds to a higher energy state than the gaseous state. At such higher energy state, it has been found that the gas assumes properties whereby it is an excellent heating medium. It has been disclosed, for instance, in U.S. Pat. No. 2,960,594 that extremely high temperatures on the order of 8,500°F and upwards can be provided by passing the mixture of gases through a nozzle containing an electric arc. Other U.S. patents of interest in this field include U.S. No. 3,145,287, U.S. Pat. No. 3,304,402 and U.S. Pat. No. 3,573,090 to name but a few. The arc is established between two oppositely polarized electrodes employing a current generally in the range of 155–1,000 amps.

The gas can be heated to such an extent that powder fed at the nozzle of the gun can be so melted or heat softened that it can be sprayed onto a relatively cool workpiece. The high energy plasma state of the gas causes the particles to assume an elevated temperature state whereby they readily adhere to the workpiece of an entirely different temperature.

Numerous gases for use in plasma flame spraying can be used. These include, in particular, nitrogen or argon which have been found to provide an excellent primary gas. Flame spraying can be performed using only a primary gas such as argon. It is also known in the flame-spraying technology to use an additional gas, denominated as a secondary gas, to provide extremely desirable results. Thus, a minor amount of hydrogen added to a nitrogen or argon stream improves the arc characteristics and the temperature of the plasma gas. Other typical secondary gases include: helium added to argon or nitrogen, argon added to nitrogen and nitrogen added to argon.

In flame-spraying technology, the arc is caused to be struck in position over an area within the nozzle. It is known that upon initiation of the arc that the arc is caused to pass between the electrode and the wall of the nozzle. It is also known that the disposition of the arc within the nozzle can be regulated to some extent by varying process parameters although the movement of the arc in response to such process parameters is limited.

It is known in the art that high speed flame-spraying can be conducted by employing higher velocity flow rates of gas through the nozzle. However, as disclosed in U.S. Pat. No. 3,573,090 to Peterson this process is characterized by low coating deposit efficiency. The reason for this is that although the higher velocities are desirable in improving the process in some respects the process is limited because of the limitations on the power through the arc. Moreover, by using high flow rates at low power levels there is the increased possibility that the high gas rate will cause some of the powder fed into the resultant flame to be directed to zones other than those zones in which the flame is the hottest. This results in a poor melting of the particles and low deposit efficiency. In addition to low deposit efficiency, the poor melting gives low quality coatings.

It has thus become desirable to provide a plasma flame-spraying process conducted by use of high flow rates of gas through the nozzle in which the particle melting and deposit efficiency is improved markedly. Moreover, it has become desirable to provide a high speed plasma flame-spraying process in which substantially higher power levels can be obtained without damage to the nozzle. It has become even more desirable to provided a high velocity plasma flame-spraying process wherein the process provides superior coatings than those heretofore provided by other high velocity processes.

SUMMARY OF THE INVENTION

The long felt desideratum in the art is answered by an improvement in a process for high velocity plasma flame-spraying of a powder onto a workpiece wherein plasma gas is passed through the nozzle of a plasma flame-spraying gun at a high velocity in the unlit state of at least 90 meters per second and an electric arc is struck between an electrode within said gun and a portion of said nozzle and powder is fed into the resultant flame exteriorly of said nozzle and said gun, which improvement, for increasing deposit efficiency of the coating with the powder onto the workpiece, comprises carrying out said process such that the power through said electric arc is at least 15 kilowatts, preferably at least 20 and most preferably at least 25 kilowatts, and regulating the gas velocity, in relation to the length of nozzle and diameter of nozzle bore so as to cause the arc to strike at the exit rim of said nozzle.

In accordance with the present invention, substantially higher power levels can be employed with high velocity plasma without the problems of very short nozzle life or even immediate failure as was previously encountered. By conducting the process at such higher power levels and at increased gas flow, substantially improved thermal efficiency is provided. Moreover, because the temperature levels of the gas are so vastly increased owing to the increased power through the arc, greater powder feed rate into the gas can be provided. Thus, it has een found that by conducting a high speed process in the manner described herein, the powder feed rate into the resultant flame can be between 1 and 7 kilograms per hour or even higher. Specifically, it has been found that the powder feed rate can be between 2.5 and 5 kg per hour. This provides a markedly increased deposit efficiency and makes the process far more economical.

The benefits obtained by the process are obtained only if certain care is taken to establish the arc on the rim of the nozzle. If the arc is not established on the rim of the nozzle, it is located within the nozzle bore. If high power is employed, the nozzle will wear readily owing to the creation of pitting and the like; at the higher power and velocity levels of this invention, immediate nozzle burnout can occur.

The process is generally conducted employing a high feed rate of unlit gas through the nozzle. The "unlit gas" refers to the feed rate of the gas without power applied to the gun. If the velocity of the unlit gas is less than 90 meters per second, the arc can become removed from the rim and establish itself within the bore. If high power is employed, the current is increased. This causes damage to the nozzle and radical reduction of nozzle life. Moreover, by depositing the arc within the nozzle bore as opposed to at the rim of the nozzle, the advantages obtained by way of increased thermal and deposit efficiency are lost.

On the other hand, if the power is less than 15 kilowatts, sufficient melting of the powder, under the conditions employed, does not occur. This is especially true in instances of higher powder feed rate of 1 to 7, especially 2.5 to 5 kg per hour. Thus, this process parameter must necessarily be followed. Preferably, the power through the arc established at the exit rim of the nozzle is between 20 and 80 kilowatts, more preferably between 25 and 60 kilowatts.

The flow rate of the unlit gas through the nozzle works hand-in-hand with several other process parameters in addition to arc power levels. Thus, it is important that the bore diameter of the nozzle be so sized that the confined region in the nozzle has a diameter between 0.318 and 0.476 cm, and preferably 0.381 to 0.406 cm. If the bore diameter of the nozzle is not reduced although higher power and higher gas flow rates are employed, the velocity of the gas is not significantly increased. In such case, the arc tends to become removed from the nozzle rim and move within the nozzle bore, causing the above discussed corrosion or wear of the nozzle itself.

It is also important that the nozzle length be regulated such that the length of the nozzle's bore is between 0.508 and 1.27 cm and preferably, 0.762 to 1.016. If the nozzle length is higher than, say, 1.270 cm, the arc can too readily become established witin the nozzle bore, i.e., not at the exit rim of the nozzle. The electrode tip should be disposed in the range of 1.016 to 2.286 cm, preferably 1.651 to 1.956 cm from the rim of the nozzle. Here again, the result is that at the high powers which the process could otherwise tolerate, the current increases and erosion of the nozzle occurs.

It should be understood that all of these factors work hand-in-hand and the various process parameters are interrelated. It is essential, however, that a particular set of process parameters be selected such that the arc is established at the rim of the nozzle, for it is only under these conditions that the higher power levels can be tolerated and utilized to such advantage in improving the thermal and deposit efficiency of the process.

In carrying out the process, it is preferred that the powder is introduced into the flame exteriorly of the nozzle. Powder introduced at a point upstream of the nozzle exit can become melted or softened within the nozzle bore and deposited on the walls of the nozzle. This can cause an irregular flow and interfere with the otherwise high efficiency of the process. Moreover, there is little reason to introduce the powder at a point within the nozzle itself especially in those superhigh velocity situations to be discussed below. In fact, under certain operating conditions, problems can be encountered in depositing the powder within the nozzle bore. Thus, such an art-known method of powder introduction should not be followed under the present set of conditions.

It has been stated that the velocity of the unlit gas through the nozzle is at least 90 meters per second. Preferably, this value is 120 to 300 meters per second. Hand-in-hand with this process parameter is the gas feed rate which should be at least 0.70 standard liters per second, preferably 1.2 to 4.0 standard liters per second. Generally speaking, it is desired that the gas feed rate be as high as possible. A range of between 1.4 and 3.0 standard liters per second has been found to be highly acceptable and to provide not only improved thermal and deposit efficiencies, but to provide improved coating themselves.

At unlit gas flow rates of less than 90 meters/second there is an insufficient gas throughput to establish the arc at the rim. If the power is high and the arc ails to establish itself at the rim, then damage by way of pitting, etc., to the nozzle can ensue. Thus, it is important to utilize unlit gas flow rates of at least 90 meters/-second and preferably 120 to 300 meters/second.

Since one of the prime objectives of the present invention is to improve deposit efficiency in a high velocity plasma flame-spraying process, it is important that the powder be fed into the flame within 2 and 10 mm of the nozzle exit. Generally, the powder is fed into the flame at a rate between 1 and 7 kg/hour, especially between 2.5 and 5 kg/hour. This is a marked improvement over the earlier high velocity plasma flame-spraying processes such as described in the Peterson patent. At the higher power levels with the high velocity, it is desirable to use a third, tertiary gas. For example, the plasma gas may be a mixture of three gases from the group argon, helium, nitrogen and hydrogen. Preferably, argon is the primary gas, helium the secondary gas, and either hydrogen or most preferably nitrogen is the tertiary gas. Tertiary gas flow is 0.5 to 10% and preferably 0.8 to 5% of the primary gas flow rate. Relative adjustments of the various gases proved very beneficial in achieving a stable arc on the rim with minimum erosion, especially when using three gases.

SUPERSONIC HIGH VELOCITY PLASMA FLAME-SPRAYING PROCESS

There has been described above a procedure by which the overall efficiency of a high speed plasma flame-spraying process can be improved. Unexpectedly, it has been found that if certain process parameters are followed of an entirely different nature, the resultant coating can also be improved whereby it satisfies standards not heretofore met by coatings applied by plasma flame-spraying technology. Thus, while flame-spraying is an exceptionally fine method of imparting superior coatings to substrates, there exist certain situations where bonds between coating and substrate superior to that provided by known flame-spraying techniques are required. Such a situation exists in the coating of certain parts of jet engines such as those used in the larger aircraft, Boeing 747 and Lockheed L-1011. Coatings for these special applications had been provided by a detonation spraying process wherein the particles are propelled by the combustion products through a long barrel resembling a rifle or a small bore cannon. The powders remain in residues within the high temperature gas for an extended period of time and thus achieve a high velocity. However, such detonation process is very expensive, very dangerous due to the explosive nature thereof and requires use of a "block house".

It has now been found that coatings heretofore provided only by such a process can be provided by a high velocity plasma flame-spraying process. To provide these improved coatings, as will be more fully described below, it is necessary to conduct the high velocity plasma flame-spraying in the manner set forth above, but to utilize additional process parameters. Thus, in the high speed plasma flame-spraying, the velocity of the unlit gas is also at least 90 meters/-second, the electric arc is struck between the cathode and the rim of the nozzle and the powder is fed exteriorly into the resultant flame. Conditions must also be selected whereby the arc created at the exit rim of the nozzle is maintained at that point. Power levels must also be employed of a magnitude of at least 15 kilowatts and preferably at least 20 kilowatts, most preferably above 25 kilowatts.

The enthalpy, or heat content, of the plasma flame is important for heating the powder particles. Enthalpy may be calculated by dividing the primary gas flow rate (in standard liters per second - SL/S - "standard" means measured at atmospheric pressure) into the power level (in kilowatts-kw) and multiplying by a suitable thermal efficiency factor. The thermal efficiency is typically 75% in the plasma gun operation of this invention and ranges from 25 to 80% in various guns. It was determined that in longer nozzles with the arc striking inside the nozzle wall, the thermal efficiency was substantially reduced, for example, 60% or lower.

Although enthalpy can be correlated with a plasma "stagnation" temperature by means of gas dynamic theory, such data is only approximate. "Stagnation" temperature is the theoretical temperature the plasma would have at rest. A high speed flowing plasma has an actual or "static" temperature somewhat lower due to the energy in the flow. Desirable operating conditions are as follows:

Argon at 15 kw input, 1.6 standard liters per second[1] and 75% thermal efficiency gives 7,150 joules/standard liter of gas enthalpy, at approximately 7,200°C stagnation temperature.

[1]A standard liter per second is gas flow rate assuming that the gas is at atmospheric pressure and the temperature is at 25°C.

Argon at 20 kw and 1.6 standard liters per second gives an enthalpy of 9500 joules/standard liter and corresponds to 9,150°C; 35 kw and similar flow correspond to enthalpy of 16,000 joules/standard liter, or about 11,000 C.

To obtain the improved coatings which are denser than those heretofore provided and are characterized by a greater wear resistance, it is necessary to:

1. Maintain a gas back pressure within the nozzle of more than 1 atmosphere gauge, whereby there are created zones of compression and rarefaction coterminously in the resultant flame;

2. Maintain an ignited plasma gas enthalpy at the exit rim of the nozzle, of at least 7,000 joules/standard liter of gas.

It is also necessary that the powder be introduced into the zones of rarefaction.

In conducting the process by utilizing these particular sets of process parameters, there is provided a supersonic type process wherein the gas conditions are equivalent to supersonic values. Preferably, the gas back pressure is in excess of 3.3 up to 7 gauge and the enthalpy of the plasma gas is at least 9,500 joules per standard liter of gas. In conducting this super-high velocity flame-spraying, the velocity of the unlit gas through the nozzle is at least 90 and preferably at least 120 meters per second and generally in the range of 120-300 meters per second.

At back pressures of 1 atm gauge and enthalpy of 7,150 or temperatures of 7,200°C, there is provided a set of conditions corresponding approximately to Mach I. When the back pressure is increased to 2 atm gauge at similar temperature, the conditions are equivalent approximately to 1.3 Mach. When the back pressure is about 4 atm gauge at 7,200°C, a Mach value of about 1.7 is provided. At higher enthalpy and temperature, Mach number calculations become more complex and less accurate; however, Mach number greater than 1 is desirable. In conducting the process it is desirable that the ratio of ambient pressure to back pressure be within the range of 0.487 to 0.100, preferably between 0.300 and 0.150.

Within these sets of conditions there are created areas of compression and rarefaction which resemble a linear series of shock diamonds interconnected by elliptically shaped zones. Of course, at the values corresponding to the lower Mach numbers the shock diamonds will not be as visible discernible as when higher Mach values are selected. In any event, there is discernible a visible change in the flame characteristics themselves whereby certain zones of compression and rarefaction are created.

The first shock diamond effect is noted at the very orifice of the nozzle and this shock diamond is interconnected with a shock diamond disposed towards the workpiece by an elliptically shaped elongated zone. Following that elliptically shaped zone and the shock diamond disposed outwardly toward the workpiece thereof, there is a second elliptically shaped zone which interconnects the second shock diamond with still a third shock diamond. It is believed that the creation of this particular flame effect provides a marked increase in turbulence of the powder distributed into the flame.

Thus, it has been surprisingly found that if the powder is introduced at the proper point into the flame, the powder becomes melted better than would be predicted from the temperature of the flame alone. Indeed, the net effect on the spraying operations is so marked that the coatings are superior to coatings thus far produced in the plasma flame-spraying art.

Thus, it has been found that the improved coatings can be provided by selecting, in accordance with the invention, those sets of parameters which provide supersonic high-velocity deposition of powders. It has been found, suprisingly, that supersonic powder deposition can be provided by the creation of these zones of compression and rarefaction without resort to a Laval type of expanded orifice in the nozzle. (A Laval expansion nozzle is shown in U.S. Pat. No. 2,922,869 and described in Elements of Gasdynamics, Galcit Aeronautical Series, pp. 124–125). In fact, the present invention proceeds in an opposite direction to the general thinking in the plasma flame-spraying art.

During this super-high velocity supersonic plasma flame-spraying process, it is critical that the powder be discharged into the flame at a particular point, i.e., in the region between adjacent shock diamonds, that region corresponding to a region of rarefaction. It has been found that if the powder is discharged into the flame within a shock diamond, corresponding to a region of compression, the turbulence created within such compression region at those points is so great that the spray powders are caused to be deflected away from the flame. The result of this, of course, is that the powder is not deposited in the substrate.

It is also of critical importance in the use of the supersonic technique that the powder be discharged outside the nozzle of the gun. The reason for this is that with the increased velocity of gases through the nozzle and with the creation of even higher voltages in the arc, there exists a substantial likelihood that appreciable amounts of powder can be discharged onto the inner walls of the nozzle that the powder is fed internally of the plasma gun. However, it is important that the point at which the powder enters the flame be correlated with the point at which the arc is struck. Therefore, the powder is introduced into the flame at a point between 2 and 10 mm of the downwardmost point where the arc is struck, preferably between 4 and 8 mm. By introducing the powder therein, by regulating the gas flow rate, the gas velocity, the diameter and the length of the nozzle, the power through the arc, improved flame characteristics with desirable turbulence can be provided so that particles entering the flame at the point of turbulence are placed into a state and impinge against the cool workpiece in such a manner as to provide a type of bond not heretofore provided by plasma flame-spraying technology. It is, of course, critical that the back pressure within the nozzle be more than 1 atm gauge and that the stagnation temperature of the ignited plasma gas be at least 7,000°C, preferably 9,000°C, and most preferably 11,000 to 17,000°C.

The bonds provided by this improved high gas flow rate process are characterized by tensile values in excess of 700 kilograms per square centimeter when tested according to ASTM (American Society for Testing amd Materials) standard method C 633-69. This compares with prior bond strengths of below 500 kg/cm$^2$.

The coatings provided by this supersonic technique are also more dense than those heretofore provided and are characterized by a markedly lower degree of oxidation.

BRIEF DESCRIPTION OF THE DRAWINGS

Referring to the drawings herein.

DESCRIPTION OF APPARATUS EMBODIMENT

Figure 1:
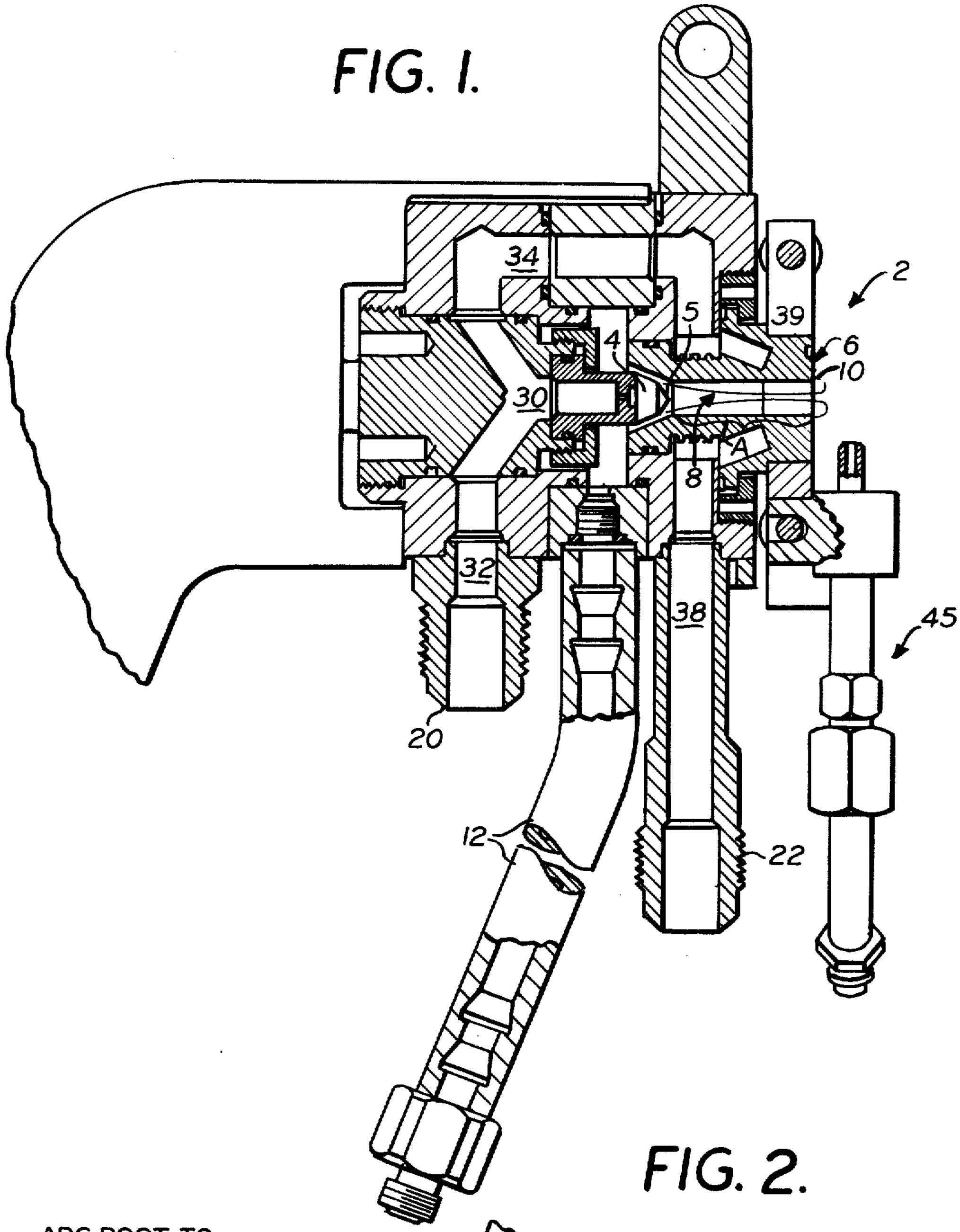
FIG. 1 is a cross-sectional elevation of a plasma flame-spraying apparatus which can be utilized in the process of the invention to provide improved coating.

Referring to the drawings herein, reference numeral 2 designates the powder gun itself comprising a cathode 4 and a nozzle 6 having a nozzle bore 8 and a nozzle exterior rim 10. The plasma flame-spraying gun is provided with a source of plasma gas 12 to which can be admixed a secondary gas. Electric cables are connected to the apparatus at points 20 and 22 to allow the arc to be initially struck from the tip 5 of the cathode in the conventional manner. There is provided a passage 30 through which cooling water can pass. This passage is in fluid communication with passage 32 and passage 34. The purpose of the water is to cool the gun so as to avoid erosion of the material due to the high temperatures which would otherwise be generated. There is also provided a passage 38 which allows water to flow into the blind holes 39. The plasma gun is similar to that shown in the Siebein et al. patent, U.S. Pat. No. 3,145,287.

A primary difference resides in the fact that the nozzle bore 8 is of a generally constant cross-sectional area. It is particularly interesting to note that with the constant area nozzle of the gun depicted in FIG. 1, supersonic effects can be provided. This is without allowing the gas to undergo expansion as in a Laval type expander as it travels through the gas orifices and the nozzle bore.

A second difference that the gun of FIG. 1 has from the Siebein et al gun is that the present gun disposes the powder feeder 45 exteriorly of the nozzle so as to allow the powder to be introduced into the arc which is created at the rim of the nozzle. In FIG. 1 there is shown the manner by which the arc is struck at the rim. It will be understood, of course, that the situation is far more dynamic than can be shown pictorially in FIG. 1.

The feature which may not be apparent from analysis of FIG. 1 that is of considerable importance is that the nozzle bore diameter is reduced when compared to the nozzle bore diameters heretofore employed. In construction the nozzle bore diameter is maintained such that it has a diameter between 0.318 and 0.476 cm. Additionally, the length of the nozzle has been adjusted so that in the bore region, the bore has a length of 0.508 to 1.27 cm and preferably 0.762 to 1.016 cm. This can be accomplished in most existing plasma flame-spraying apparatuses by a substitution of the normally copper nozzle for a nozzle having the same fittings but having different internal diameters as specified above and with suitably located external powder feedport.

Figure 2:
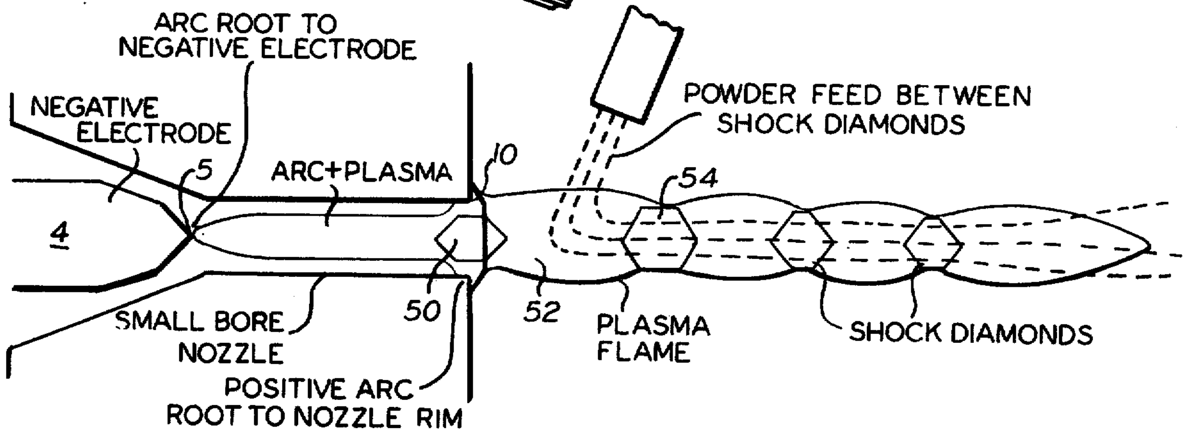
FIG. 2 is an expanded view of the nozzle of the invention showing the disposition of powder into the regions between shock diamonds.

FIG. 2 shows the manner in which the metal is introduced into the regions of rarefaction. Note that the arc is struck between the cathode 4 having tip 5 at the rim 10 of the nozzle. At the nozzle orifice there is a first shock diamond 50 which is a region of compression joined by a generally elliptical zone 52, a region of rarefaction with a downstream shock diamond 54. These shock diamond alternate with elliptically shaped zones, i.e., the zones of compaction alternate with the zones of rarefaction as the flame passes from the nozzle.

In order to more fully illustrate the nature of the invention, the following Examples are presented:

EXAMPLE 1

A tungsten carbide aggregate powder with 12% cobalt was plasma flame sprayed under various conditions with results given in Table I. The powder size was −44 + 15 microns. The plasma gun was of the type shown in FIG. 1.

EXAMPLE 2

A 17% cobalt tungsten carbide powder sized 90% minus 30 microns was sprayed with parameters and results of Table II. Coatings were of such quality as to be considered for substitution for detonation gun coatings in critical aircraft engine applications, particularly mid-span turbine blade supports.

EXAMPLE 3

A fused tungsten carbide powder with 12% cobalt sized −44 + 5 microns was sprayed at 24 kilowatts at different spray rates. Coating quality remained excellent even at the very high spray rates (see Table III).

EXAMPLE 4

Other powders sprayed with similar high velocity conditions included cobalt alloy, aluminum oxide, molybdenum, chromium carbide/nickel alloy blend, composite titanium oxide/aluminum oxide and nickel-chromium alloy. In each case a high quality coating was obtained.

EXAMPLE 5

The procedure of Example 2 was repeated with the same nozzle and powder except that no secondary gas was employed (all gas was argon); the argon gas flow rate was 1.49 standard liters per second; the current was 350 amps, and the voltage was 85 volts (Power = 30 Kilowatts). The sprayed article had about the same properties as that sprayed according to Example 2.

ADDENDUM - TABLE I

TEST DESCRIPTION FOR ABRASIVE WEAR

The powders were sprayed under the conditions set forth in Table I to produce coatings which were tested for abrasion resistance as follows:

1. Measure the thickness of the test buttons (including coating) in four places, using a Supermicrometer, and record the readings. (Locate the four points for a subsequent measurement by placing marks or numbers on the periphery of the button).
2. Weigh each button accurately, using an analytical balance, and record the weight.
3. Insert a drive assembly in a drill press spindle.
4. Place a platform scale on the drill press table. Pull the drill press arm (handle) down to a horizontal position and lock it in place.
5. Raise the drill press table until the drive assembly indicates a 11.25 kg load on the scale platform.
6. Unlock the drill press spindle. Hang a weight on the press arm, located so as to indicate a 11.25 kg reading on the scale. Mark the point on the arm where this reading is obtained.
7. Remove the scale.
8. Raise the spindle and replace the aligning pin with a 3.18 cm. blank pin.
9. Place two test buttons on a wear track. Lower the spindle until drive pins enter the drive holes in the buttons. Lock in place, with no load on the buttons.
10. Start the drill press. Pour into pan a thoroughly mixed slurry of alumina abrasive powder (Metco 101) − 270 mesh + 15 microns in a slurry of 25 grams of abrasive in 200 cc of light machine oil. Release the lock on the spindle so that the 11.25 kg load is applied to the test buttons. Record the starting time.
11. Allow the test to run 20 minutes.
12. Remove the buttons and wash them in solvent. Weigh and measure the thicknesses and record the readings for comparison with the original readings.

TABLE I

| | Standard Velocity | High Velocity (a) | (b) | (c) |
|---|---|---|---|---|
| Nozzle diamter | .554 cm | .396 cm | .396 cm | .396 cm |
| Nozzle length | 1.66 cm | .909 cm | .909 cm | .909 cm |
| Primary gas | Argon | Argon | Argon | Argon |
| Secondary gas | Helium | Hydrogen | Hydrogen | Helium |
| Tertiary gas | — | — | — | Nitrogen |
| Primary gas flow | 1.255 SL/S | 1.6 SL/S | 1.49 SL/S | 2.124 SL/S |
| Secondary gas flow | 1.132 SL/S | .039 SL/S | .086 SL/S | 2.690 SL/S |
| Tertiary gas flow | — | — | — | .0665 SL/S |
| Voltage | 70–75 v. | 100 v. | 100 v. | 115 v. |
| Current | 500 amps. | 300 amps. | 400 amps. | 550 amps. |
| Kilowatts | 35–37.5 kw | 30 kw | 40 kw | 63 kw |
| Spray rate | 2.7–4.1 kg/hr | 2.7 kg/hr | 2.7 kg/hr | 2.7 kg/hr |
| Carrier gas | .16 SL/S | .118 SL/S | .118 SL/S | .16 SL/S |
| Deposit efficiency | 70% | 50% | 60% | 65% |
| Bond strength[1] | 492 kg/cm² | 703 kg/cm² | 703 kg/cm² | 703 kg/cm² |
| Hardness[2] | Rc 55–60 | Rc 55–60 | Rc 55–60 | Rc 55–60 |
| Abrasive wear[3] | (Standard) | — | 1.25 × better than standard | 1.25 × better than standard |

SL/S = Standard liter per second

[1]ASTM Standard Method C633-69
[2]Standard Rockwell Testor, "C" Scale
[3]See Test Description-Addendum Table I

TABLE II

| | |
|---|---|
| Nozzle | .396 cm diameter, 1.092 cm length |
| Gases | Argon - 1.6 standard liters/sec; Hydrogen - .032 to .047 standard liters/sec |
| Power | 20 kilowatts - 100 volts, 200 amperes |
| Spray rate | 2.7 kg/hr |
| Deposit efficiency | 60% |
| Coating hardness | Rockwell testor, Rc 55–65 |
| Bond Strength | Greater than 703 kg/cm² |

TABLE III

| | Standard Velocity | High Velocity |
|---|---|---|
| Nozzle Diameter | .554 cm | .396 cm |
| Nozzle Length | 1.66 cm | 1.09 cm |
| Argon | .8 standard liters/sec | 1.6 standard liters/sec |
| Hydrogen | .08 standard liters/sec | .0316 to .0472 standard liters/sec |
| Voltage | 57 volts | 100 volts |
| Current | 420 amperes | 240 amperes |
| Spray Rates | Deposit Efficiency | |
| 3.6 kg/hr | 60% | 33% |

TABLE III-continued

| | Standard Velocity | High Velocity |
|---|---|---|
| 6.8 kg/hr | – | 20% |
| 11.25 kg/hr | 40% | 18% |

What is claimed is:

1. A process for high velocity plasma flame-spraying of a powder onto a workpiece which comprises:

a. Passing a plasma gas through the nozzle of a plasma flame-spraying gun at an unlit gas velocity of at least 90 meters per second;

b. Striking an electric arc having at least 15 kilowatts power within said gun and disposing said arc between an electrode within said gun and a portion of said nozzle and a portion of said nozzle and regulating the gas velocity in relationship to the length of the nozzle and the diameter of the bore of said nozzle to maintain said arc on the exit rim of said nozzle;

c. Maintaining a gas back pressure within said nozzle of at least 1 atmosphere gauge whereby there are created zones of compression and zones of rarefaction coterminously in the resultant flame;

d. Maintaining an ignited plasma gas enthalpy at the exit of said nozzle of at least 7,000 joules per standard liter of gas; and e. Introducing powder into the zones of rararefaction of said resultant flame.

2. A process according to claim 1 wherein a. the velocity of the unlit gas through the nozzle is at least 120–300 meters per second, b. the gas back pressure within the nozzle is in excess of 3.3 atm gauge, c. the enthalpy of the plasma gas is at least 9,500 joules per standard liter of gas.

3. A process according to claim 2 wherein the gas back pressure within the nozzle is 3.3 atm gauge to 7 atm gauge.

4. A process according to claim 3 wherein the theoretical stagnation temperature of the ignited plasma gas is 11,000°C. to 17,000°C.

5. A process according to claim 2 wherein the ratio of the pressure of the ambient atmosphere exterior of the nozzle to the back pressure is between 0.487 and 0.100.

6. A process according to claim 5 wherein the ratio of the pressure of the ambient atmosphere to the back pressure is between 0.300 and 0.150.

7. A process according to claim 2 wherein three plasma gases are passed through said nozzle.

* * * * *